No. 822,077. PATENTED MAY 29, 1906.
G. W. RICH.
CHECK VALVE.
APPLICATION FILED SEPT. 5, 1905.
2 SHEETS—SHEET 1.
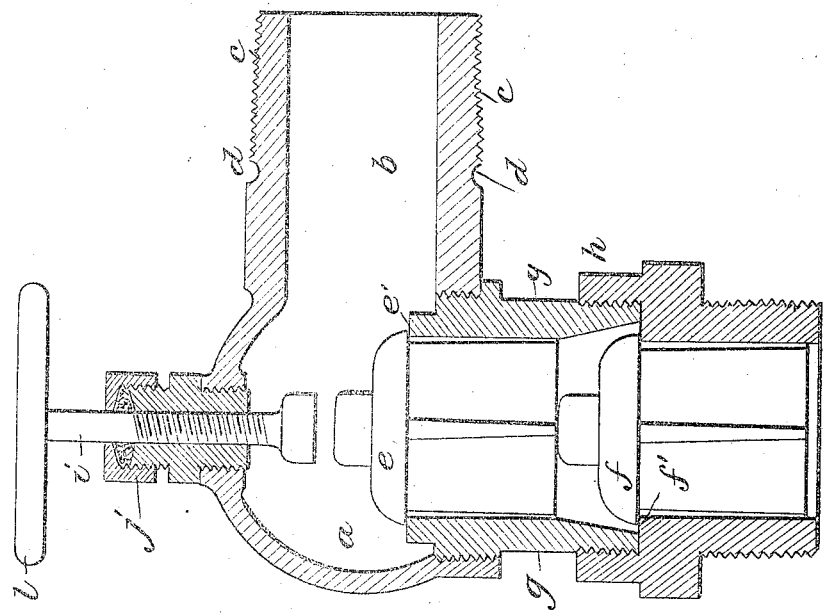
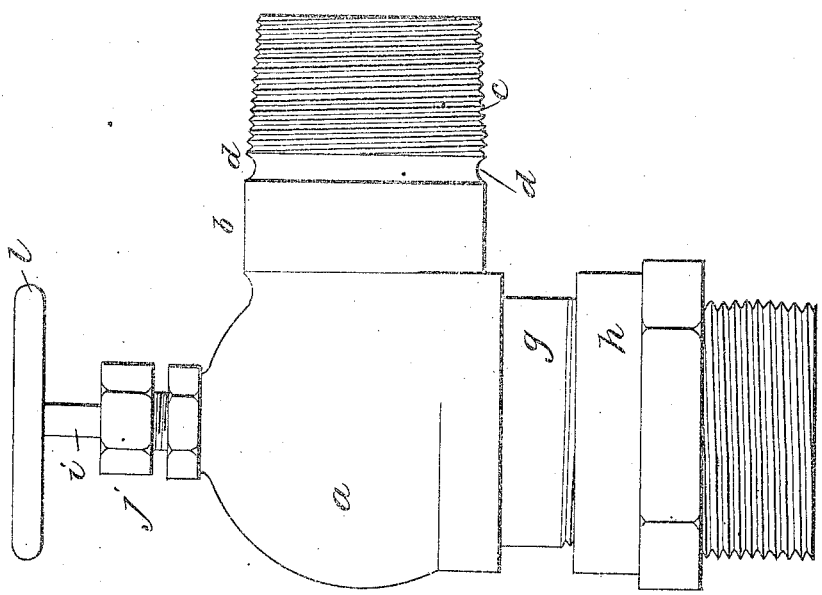
Witnesses:
L. S. Burket
Arthur W. Crosley
Inventor:
George W. Rich,
By Louis Bagger & Co.
Attorneys No. 822,077. PATENTED MAY 29, 1906.
G. W. RICH.
CHECK VALVE.
APPLICATION FILED SEPT. 5, 1905.

2 SHEETS—SHEET 2.

Witnesses
Inventor:
George W. Rich,
By
Attorneys.

UNITED STATES PATENT OFFICE.

GEORGE W. RICH, OF MEMPHIS, TENNESSEE, ASSIGNOR OF ONE-HALF TO JAMES S. LIGHTBURNE, OF MEMPHIS, TENNESSEE.

CHECK-VALVE.

No. 822,077.

Specification of Letters Patent.

Patented May 29, 1906.

Application filed September 5, 1905. Serial No. 277,079.

*To all whom it may concern:*

Be it known that I, GEORGE W. RICH, a citizen of the United States, residing at Memphis, in the county of Shelby and State of Tennessee, have invented new and useful Improvements in Check-Valves, of which the following is a specification.

This invention has relation to check-valves for use wherever it may be found convenient to employ them. As here shown, the valve is particularly adapted for use on steam-boilers in connection with the feed-water or other appliances.

It is the object of the invention to provide completely simple and practical means whereby the main valve may be removed and reground when desired while full steam is in the boiler. Where it has heretofore been proposed to do this, so far as I am aware, it has been attended with more or less difficulty because of the means surrounding the placement of the valves.

The drawings hereto annexed form a part of this specification and are to be referred to as such and as showing the structure defined in the subjoined claims.

Figure 3:
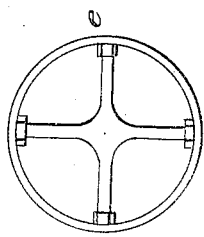
Figure 4:
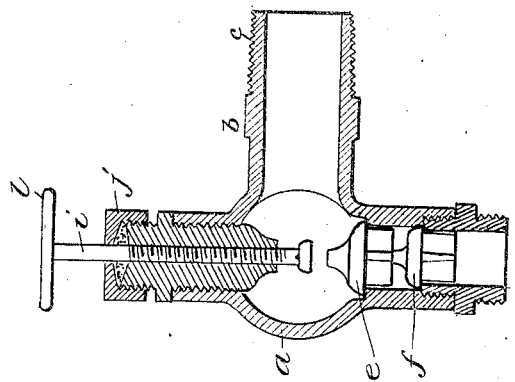

Of the drawings, Figure 1 is a side elevation of the valve. Fig. 2 is a central sectional view of the invention and associated devices, some of the parts for the sake of clearness of illustration being represented in elevation. Fig. 3 is a bottom view of one of the wing-valves. Fig. 4 is a modified arrangement of valves embodying the improvements.

In the drawings, *a* designates a casing provided with an extension or stem *b*, the outer end of which is threaded, as at *c*, to enable it to be screwed into a boiler to the extent of the annular groove *d*.

*e* and *f* are wing-valves, each of which is respectively adapted to operate in a connection *g h*, and each connection is provided with a valve-seat *e' f'* for the respective valves.

*i* designates a stem tapped through a stuffing-box *j* in the top of the casing *a* directly over the center of the valve *e*, so that by turning down the stem *i* through the medium of its handle *l* the valve *e* will be pressed and held steam-tight on its seat, so as to enable the connection or section *h* to be unscrewed and the main valve *f* taken out and reground or repaired or to be replaced by another. When this last-mentioned work is done, the connection *h* with the valve in place therein may be screwed on the connection or section *g*, the stem *i* unscrewed or turned up to its former position, when the valves will be free to act in the performance of the office of an ordinary check-valve.

The chief points of advantage and desirability reside in the simplicity of the structure and the readiness with which the parts may be manipulated. I therefore regard each element or part of importance in the structure and would depart therefrom only in so far as it may come within the scope of a skilled mechanic. For example, as shown in Fig. 4, the valves are of slightly different shape or form, so as to allow the top valve to be inserted from the top and the bottom valve from the bottom; but the principle is the same.

I claim—

1. A check-valve for the purposes set forth embodying in its construction a casing provided with a screw-threaded stem, two connections, each provided with a valve-seat, one connection being adapted to be screwed into the casing and the other adapted to be attached to the first named by screw-threaded means, a wing-valve seated in each connection, a stuffing-box in the casing over the center of the upper valve, a stem extended through said stuffing-box and a handle on the outer end of the said stem to enable it to be turned down on the upper valve and press it down to a steam-tight degree upon its seat.

2. A check-valve for the purposes set forth embodying in its construction a casing provided with a screw-threaded stem, two connections, each provided with a valve-seat, one connection being adapted to be screwed into the casing and the other adapted to be attached to the first named by screw-threaded means, a wing-valve seated in each connection, a stuffing-box in the casing over the center of the upper valve, and means extended through said stuffing-box and adapted to act upon the valve therebelow to press it down and hold it upon its seat.

3. A check-valve comprising a casing, means for securing the casing to a steam-boiler, two connections each provided with a valve-seat, and a wing-valve seated in each connection, in combination with means for securing one valve rigidly upon its seat.

4. A check-valve comprising a casing, means for securing the casing to a steam-boiler, two connections each provided with a valve-seat, and a wing-valve seated in each connection, one above the other, in combination with means for securing the upper valve rigidly upon its seat and permitting the lower valve and its connection to be removed.

In testimony whereof I affix my signature in presence of two subscribing witnesses.

GEORGE W. RICH.

Witnesses:
S. L. COCKROFT,
CHAS. LOVEJOY